(12) United States Patent
Nam et al.

(10) Patent No.: US 8,954,734 B2
(45) Date of Patent: Feb. 10, 2015

(54) METHOD FOR TRANSMITTING CONTENTS FOR CONTENTS MANAGEMENT TECHNOLOGY INTERWORKING, AND RECORDING MEDIUM FOR STORING PROGRAM THEREOF

(75) Inventors: Do-Won Nam, Daejeon (KR);
Yeon-Jeong Jeong, Daejeon (KR);
Ki-Song Yoon, Daejeon (KR);
Jung-Hyun Kim, Daejeon (KR);
Jee-Hyun Park, Daejeon (KR);
Jung-Soo Lee, Jeonju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 12/674,039

(22) PCT Filed: Dec. 20, 2007

(86) PCT No.: PCT/KR2007/006705
§ 371 (c)(1),
(2), (4) Date: Feb. 18, 2010

(87) PCT Pub. No.: WO2009/025424
PCT Pub. Date: Feb. 26, 2009

(65) Prior Publication Data
US 2011/0029768 A1 Feb. 3, 2011

(30) Foreign Application Priority Data
Aug. 21, 2007 (KR) .................. 10-2007-0083961
Dec. 14, 2007 (KR) .................. 10-2007-0131494

(51) Int. Cl.
*G06F 21/00* (2013.01)
*G06F 21/10* (2013.01)
*G06F 21/62* (2013.01)

(52) U.S. Cl.
CPC .............. *G06F 21/10* (2013.01); *G06F 21/62* (2013.01); *G06F 2221/0728* (2013.01); *G06F 2221/0759* (2013.01)
USPC ............................. 713/160; 726/27

(58) Field of Classification Search
CPC . G06F 21/10; G06F 21/62; G06F 2221/0759; G06F 2221/0728; H04N 7/26; H04L 2209/603
USPC ............................. 713/160; 726/27
See application file for complete search history.

(56) References Cited

U.S. PATENT DOCUMENTS 5,969,750 A * 10/1999 Hsieh et al. ............... 348/14.1
6,064,489 A * 5/2000 Nosaki et al. ............. 358/1.13

(Continued)

FOREIGN PATENT DOCUMENTS

| JP | 2003-157334 A | 5/2003 |
|---|---|---|
| JP | 2003-228636 A | 8/2003 |

(Continued)

OTHER PUBLICATIONS

Do-Won Nam et al., "DRM Content Adaption between Different DRM Systems for Seamless Content Service," International Symposium on Consumer Electronics 2007 (ISCE 2007), Jun. 21, 2007, Texas, U.S.A.

(Continued)

*Primary Examiner* — Michael Pyzocha (57) ABSTRACT

A DRM technique interoperability system includes an exporter and an importer. The exporter cancels the DRM technique from the contents to which the DRM technique of a DRM device is applied to generate a contents stream, generates a plurality of packets from the contents stream, and transmits the packets to the importer. The importer receives a plurality of packets from the exporter, generates a contents stream from the plurality of packets, applies a DRM technique of a second DRM device to the contents stream, and provides it to the second DRM device.

17 Claims, 5 Drawing Sheets

(56) References Cited

U.S. PATENT DOCUMENTS

| | | | |
|---|---|---|---|
| 6,891,799 B1 * | 5/2005 | Hagai et al. | 370/235 |
| 7,376,976 B2 | 5/2008 | Fierstein et al. | |
| 7,397,817 B2 | 7/2008 | Kawaguchi et al. | |
| 7,408,953 B2 | 8/2008 | Kawaguchi et al. | |
| 7,424,034 B2 | 9/2008 | Kawaguchi et al. | |
| 7,484,103 B2 | 1/2009 | Woo et al. | |
| 2003/0028490 A1 | 2/2003 | Miura et al. | |
| 2003/0086017 A1 * | 5/2003 | Bogot | 348/558 |
| 2003/0103523 A1 * | 6/2003 | Frossard et al. | 370/465 |
| 2004/0114570 A1 * | 6/2004 | Vikberg et al. | 370/351 |
| 2004/0128396 A1 * | 7/2004 | Patrick et al. | 709/231 |
| 2005/0044391 A1 | 2/2005 | Noguchi et al. | |
| 2005/0254645 A1 * | 11/2005 | Shippy et al. | 380/28 |
| 2006/0021056 A1 | 1/2006 | Koppen | |
| 2006/0277598 A1 | 12/2006 | Ahn | |
| 2006/0288123 A1 | 12/2006 | Vered | |
| 2007/0033213 A1 * | 2/2007 | Bezrukov et al. | 707/102 |
| 2007/0130076 A1 | 6/2007 | Park et al. | |
| 2007/0204064 A1 | 8/2007 | Mail et al. | |
| 2008/0076470 A1 * | 3/2008 | Ueda et al. | 455/556.1 |
| 2008/0086569 A1 * | 4/2008 | Arora et al. | 709/231 |
| 2008/0126801 A1 * | 5/2008 | Lee et al. | 713/167 |
| 2008/0154778 A1 * | 6/2008 | Lee et al. | 705/51 |
| 2008/0250508 A1 * | 10/2008 | Montague et al. | 726/28 |
| 2010/0169221 A1 * | 7/2010 | Ahn et al. | 705/54 |
| 2010/0257370 A1 * | 10/2010 | Yoon et al. | 713/189 |

FOREIGN PATENT DOCUMENTS

| | | |
|---|---|---|
| JP | 2004-282584 A | 10/2004 |
| JP | 2005-514703 A | 5/2005 |
| JP | 2006-048871 A | 2/2006 |
| KR | 1020060116967 A | 11/2006 |
| WO | WO 2005/010763 A1 | 2/2005 |
| WO | WO 2006/043784 A1 | 4/2006 |
| WO | WO 2007/008914 A2 | 1/2007 |

OTHER PUBLICATIONS

International Search Report for PCT/KR2007/006705 filed on Dec. 20, 2007.

Written Opinion of the International Searching Authority for PCT/KR2007/006705 filed on Dec. 20, 2007.

* cited by examiner

METHOD FOR TRANSMITTING CONTENTS FOR CONTENTS MANAGEMENT TECHNOLOGY INTERWORKING, AND RECORDING MEDIUM FOR STORING PROGRAM THEREOF

TECHNICAL FIELD

The present invention relates to a contents transmission method for contents management technology interoperability, and a recording medium.

This work was supported by the IT R&D program of MIC/IITA [2007-S-017-01, Development of user-centric contents protection and distribution technology].

BACKGROUND ART

Digital rights management (DRM) technology is for protecting the rights and activating safe provision of digital contents by preventing illegal provision of digital contents having the rights. In order to build a DRM system, encryption technology, decoding technology, billing, usage right, and public key infrastructure (PKI) technology are utilized.

However, as various DRM technologies have spread, different DRM technologies have been applied to the contents or terminals, and hence, the user has sometimes failed to use the legally acquired contents in his terminal. Since the terminal conditions are varied depending on the DRM technologies and techniques for mounting the DRM are restricted by the DRM technologies, it is impossible to install a plurality of DRM clients in each terminal. Therefore, a technique for guaranteeing interoperability or compatibility between the DRM systems is required for the user's convenience and benefits.

A conventional DRM interoperability technique is provided to perform interoperability by disclosing the DRM skills between the DRM systems to be interoperated. However, it is not recommended to publicize the DRM technique since the contents free of DRM are easy to reproduce and distribute.

DISCLOSURE

Technical Problem

The present invention has been made in an effort to provide a system and method for providing DRM interoperability without disclosing DRM techniques between different DRM systems.

Technical Solution

In one aspect of the present invention, a method for transmitting contents output by a first contents management device to an importer of a second contents management device includes: canceling a contents management technique from the contents to which the contents management technique of the first contents management device is applied, and generating a contents stream; generating a plurality of packets from the contents stream; and transmitting the plurality of packets to the importer.

The method further includes acquiring a negotiation result by negotiating with the importer, and the step of generating a plurality of packets includes generating the plurality of packets according to the negotiation result.

The step of generating the plurality of packets according to the negotiation result includes: converting the contents stream into a format to be provided to the importer according to the negotiation result to generate the converted contents stream; and generating the plurality of packets from the converted contents stream.

In another aspect of the present invention, in a computer readable medium for recording a program for at least one processor to perform a method for transmitting contents output by a first contents management device to an importer of a second contents management device, the method includes: generating a contents stream, a right information stream, and a metadata stream by canceling a first contents management technique from the contents to which the first contents management technique is applied; generating a plurality of contents packets from the contents stream; generating a plurality of right information packets from the right information stream; generating a plurality of metadata packets from the metadata stream; transmitting the plurality of contents packets, the plurality of right information packets, and the plurality of metadata packets to the importer.

In another aspect of the present invention, a method for transmitting contents output by an exporter of a first contents management device to a second contents management device includes: receiving a plurality of packets from the exporter; generating a contents stream from the plurality of packets; and applying a contents management technique of the second contents management device to the contents stream to provide the contents stream to the second contents management device.

In another aspect of the present invention, in a computer readable medium for recording a program for at least one processor to perform a method for transmitting contents output by an exporter of a first contents management device to a second contents management device, a method thereof includes: receiving a plurality of packets from the exporter; classifying the plurality of packets into a plurality of contents packets, a plurality of right information packets, and a plurality of metadata packets; generating a contents stream from the plurality of contents packets; generating a right information stream from the plurality of right information packets; generating a metadata stream from the plurality of metadata packets; and applying a contents management technique of the second contents management device to the contents stream, the right information stream, and the metadata stream to provide the streams to the second contents management device.

Advantageous Effects

According to the exemplary embodiment of the present invention, there is no need to publicize the DRM techniques between different DRM systems since the DRM technique interoperability is performed through an exchange of intermediate data. Further, since the format of intermediate data is determined through negotiation between different DRM systems, there is no need to change the DRM technique for the purpose of DRM technique interoperability, and N-to-N interoperability between a plurality of DRM techniques is allowed. Also, it is easy to apply the present invention to streaming-type contents as well as downloading-type contents since packets other than files are used as intermediate data to be exchanged. In addition, since the packets are used as intermediate data to be exchanged, retransmission caused by a transmission error is reduced and the contents can be serviced in real-time.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

A DRM interoperability system according to an exemplary embodiment of the present invention will now be described with reference to FIG. 1 to FIG. 3.

Figure 1:
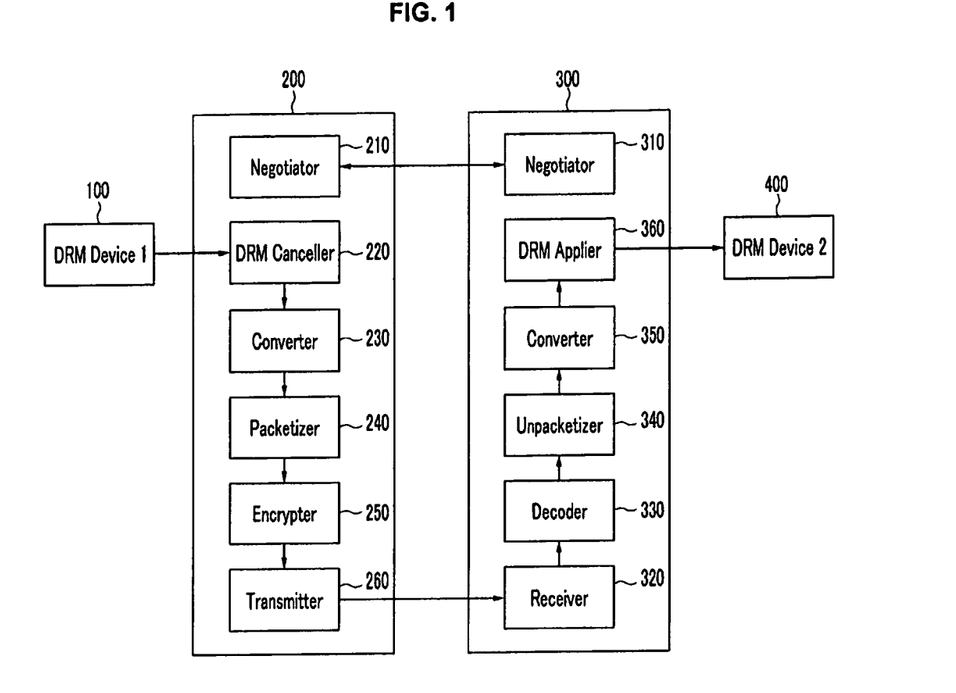
FIG. 1 is a block diagram of a DRM interoperability system according to an exemplary embodiment of the present invention.
Figure 2:
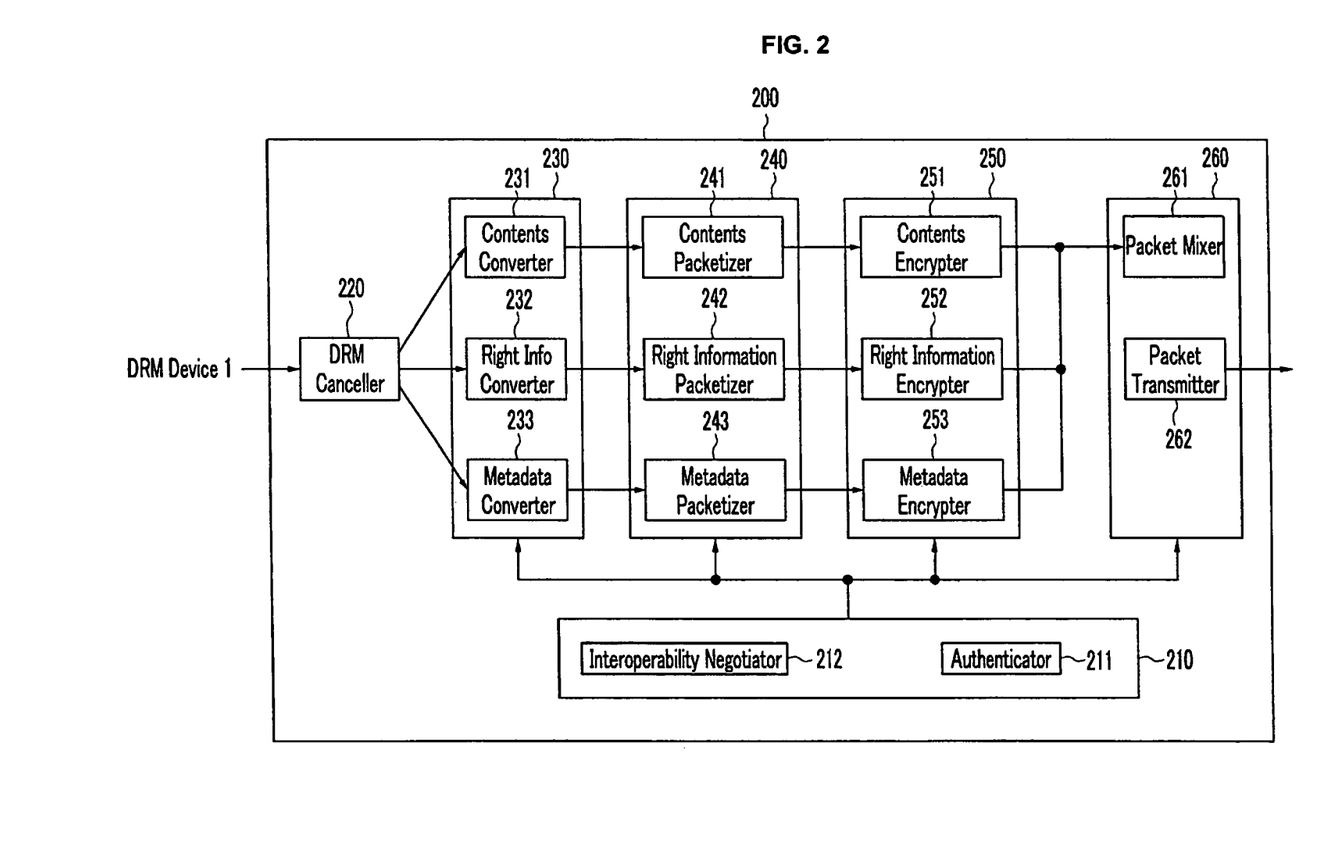
FIG. 2 is a block diagram of an exporter according to an exemplary embodiment of the present invention.
Figure 3:
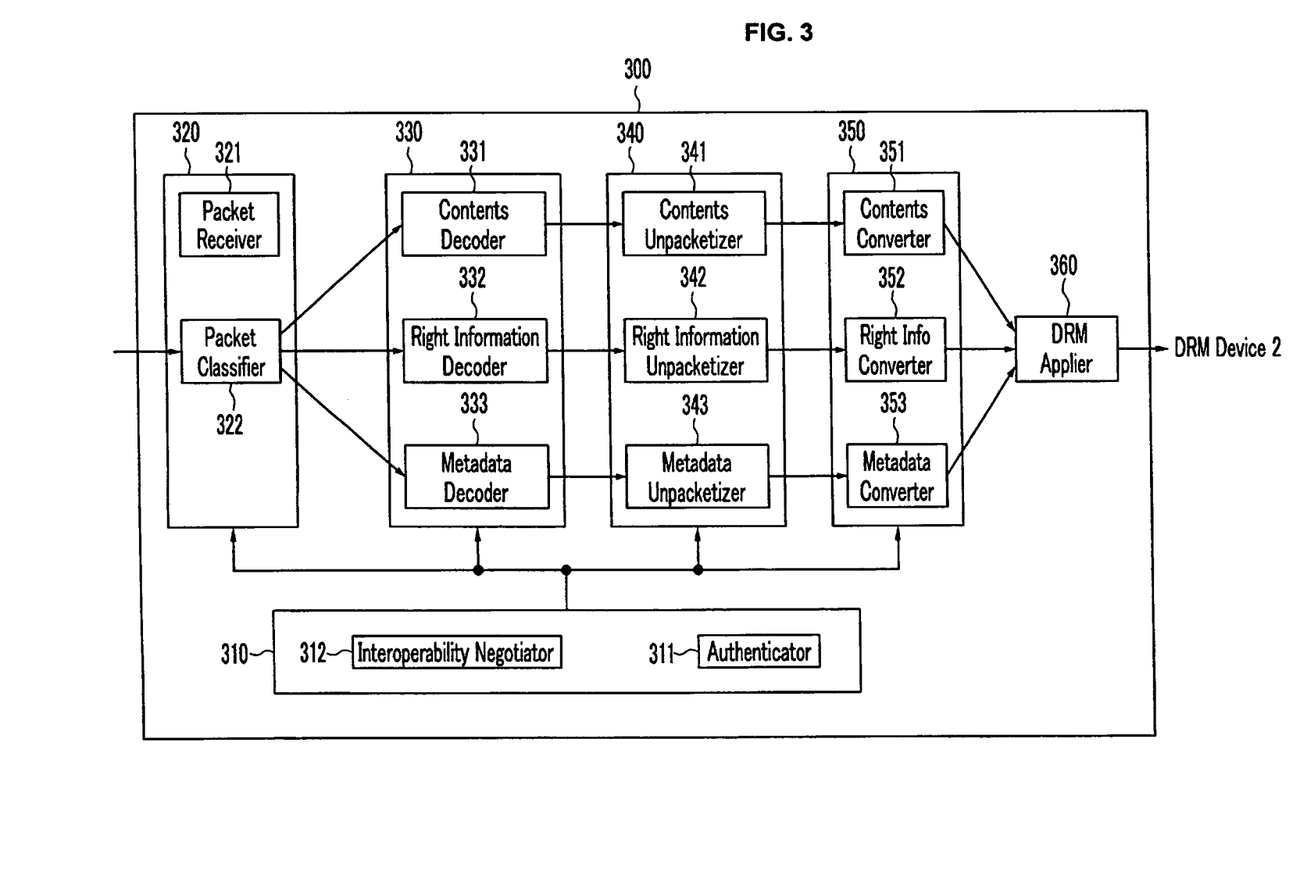
FIG. 3 is a block diagram of an importer according to an exemplary embodiment of the present invention.

FIG. 1 is a block diagram of a DRM interoperability system according to an exemplary embodiment of the present invention, FIG. 2 is a block diagram of an exporter according to an exemplary embodiment of the present invention, and FIG. 3 is a block diagram of an importer according to an exemplary embodiment of the present invention.

As shown in FIG. 1, the DRM interoperability system includes a first DRM device 100, an exporter 200, an importer 300, and a second DRM device 400.

The first DRM device 100 outputs the first DRM applied contents.

The exporter 200 receives the first DRM applied contents from the first DRM device 100, negotiates with the importer 300, converts the first DRM applied contents into a plurality of packets according to the negotiation result, and provides the packets to the importer 300. As shown in FIG. 1, the exporter 200 includes a negotiator 210, a DRM canceller 220, a converter 230, a packetizer 240, an encrypter 250, and a transmitter 260.

As shown in FIG. 2, the negotiator 210 includes an interoperability negotiator 211 and an authenticator 212. The converter 230 includes a contents converter 231, a right information converter 232, and a metadata converter 233, and the packetizer 240 includes a contents packetizer 241, a right information packetizer 242, and a metadata packetizer 243. The encrypter 250 includes a contents encrypter 251, a right information encrypter 252, and a metadata encrypter 253, and the transmitter 260 includes a packet mixer 261 and a packet transmitter 262.

The importer 300 receives a plurality of packets from the exporter 200, generates the second DRM applied contents, and provides the contents to the second DRM device 400. As shown in FIG. 1, the importer 300 includes a negotiator 310, a receiver 320, a decoder 330, an unpacketizer 340, a converter 350, and a DRM applier 360.

As shown in FIG. 3, the negotiator 310 includes an interoperability negotiator 311 and an authenticator 312, and the receiver 320 includes a packet receiver 321 and a packet classifier 322. The decoder 330 includes a contents decoder 331, a right information decoder 332, and a metadata decoder 333, and the unpacketizer 340 includes a contents unpacketizer 341, a right information unpacketizer 342, and a metadata unpacketizer 343. The converter 350 includes a contents converter 351, a right information converter 352, and a metadata converter 353.

An exporter 200 according to an exemplary embodiment of the present invention will now be described with reference to FIG. 4.

Figure 4:
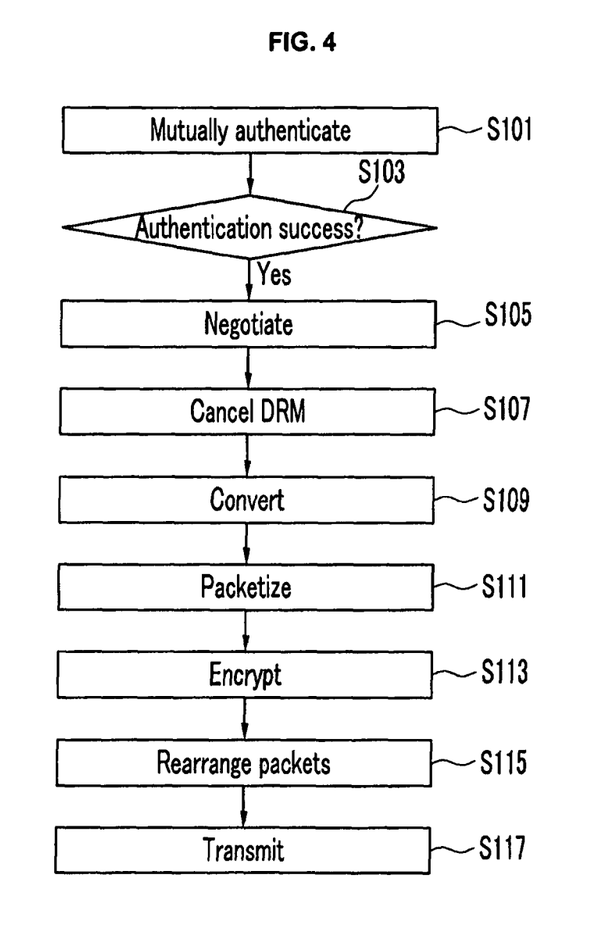
FIG. 4 is a flowchart of a contents exporting method according to an exemplary embodiment of the present invention.

FIG. 4 is a flowchart of a contents exporting method according to an exemplary embodiment of the present invention.

The authenticator 211 mutually authenticates with the authenticator 311 of the importer 300 (S101).

When the authentication is finished normally (S103), the interoperability negotiator 212 negotiates with the interoperability negotiator 312 of the importer 300 (S105). In this instance, the interoperability negotiator 212 can negotiate with the interoperability negotiator 312 about the resolution, codec, and compression rate of the contents stream to be provided to the importer 300, description language of the right information stream to be provided to the importer 300, and the description language of the metadata stream to be provided to the importer 300. Also, the interoperability negotiator 212 can negotiate with the interoperability negotiator 312 about the size, encryption method, and delivery order of the packets to be provided to the importer 300.

The DRM canceller 220 cancels the first DRM from the first DRM applied contents and unpackages the contents to generate and output a contents stream, a right information stream including a usage right for the user, and a metadata stream including additional information (S107).

The converter 230 respectively converts the contents stream, the right information stream, and the metadata stream into a format to be transmitted to the importer 300 to thus generate a converted contents stream, a converted right information stream, and a converted metadata stream S109.

In detail, the contents converter 231 receives a contents stream from the DRM canceller 220, and converts the received contents stream into a format to be transmitted to the importer 300. In this instance, the contents converter 231 can convert the contents stream into a format according to the negotiation result of the interoperability negotiator 212. That is, the contents converter 231 converts the contents stream into a converted contents stream and outputs the converted contents stream by using the resolution, codec, and compression rate according to the negotiation result of the interoperability negotiator 212. When the negotiation result exporter 200 and the importer 300 use the same format of contents stream, the contents converter 231 may not perform conversion.

The right information converter 232 receives a right information stream from the DRM canceller 220, and converts the received right information stream into a format to be transmitted to the importer 300. In this instance, the right information converter 232 can convert the right information stream into a format according to the negotiation result of the interoperability negotiator 212. That is, the right information converter 232 converts the right information stream written in the description language of the first DRM into a description language according to the negotiation result of the interoperability negotiator 212 to generate and output a converted right information stream. When the exporter 200 and the importer 300 use the same description language according to the negotiation result, the right information converter 232 may not perform conversion.

The metadata converter 233 receives a metadata stream from the DRM canceller 220, and converts the received metadata stream into a format to be transmitted to the importer 300. In this instance, the metadata converter 233 can convert the metadata stream into a format according to the negotiation result of the interoperability negotiator 212. That is, the metadata converter 233 can convert the metadata stream written in the description language of the first DRM into a description language according to the negotiation result of the interoperability negotiator 212 to generate and output a converted metadata stream. When the exporter 200 and the importer 300 use the same description language according to the negotiation result, the metadata converter 232 may not perform conversion.

The packetizer 240 separates the converted contents stream, the converted right information stream, and the converted metadata stream into a plurality of packets, and then outputs the packets (S111). In this instance, the packetizer 240 can output a plurality of packets having the size that follows the negotiation result of the interoperability negotiator 212. Each packet includes a header and a payload. The header includes packet type information for indicating whether the corresponding packet is a contents packet, a right information packet, or a metadata packet. The data corresponding to packet type information is separately recorded in the payload.

In detail, the contents packetizer 241 receives the converted contents stream from the contents converter 231 to separate it into a plurality of contents packets. In this instance, the contents packetizer 241 can separate the converted contents stream into a plurality of contents packets having the size that follows the negotiation result of the interoperability negotiator 212.

The right information packetizer 242 receives the converted right information stream from the right information converter 232 to separate it into a plurality of right information packets. In this instance, the right information packetizer 242 can separate the converted right information stream into a plurality of right information packets having the size that follows the negotiation result of the interoperability negotiator 212.

The metadata packetizer 243 receives the converted metadata stream from the metadata converter 232 to separate it into a plurality of metadata packets. In this instance, the metadata packetizer 243 can separate the converted metadata stream into a plurality of metadata packets having the size that follows the negotiation result of the interoperability negotiator 212.

The encrypter 250 encrypts a plurality of packets output by the packetizer 240 and outputs a plurality of encrypted packets so as to prevent the contents from being illegally stolen during packet transmission (S113). When there is no worry of illegal stealth of contents during the packet transmission, the encrypter 250 may not perform or omits encryption.

In detail, the contents encrypter 251 encrypts a plurality of contents packets to generate and output a plurality of encrypted contents packets. In this instance, the contents encrypter 251 can encrypt a plurality of contents packets by using the encryption method caused by the negotiation result of the interoperability negotiator 212.

The right information encrypter 252 encrypts a plurality of right information packets to generate and output a plurality of encrypted right information packets. In this instance, the right information encrypter 252 can encrypt a plurality of right information packets by using the encryption method that follows the negotiation result of the interoperability negotiator 212.

The metadata encrypter 253 encrypts a plurality of metadata packets to generate and output a plurality of encrypted metadata packets. In this instance, the metadata encrypter 253 can encrypt a plurality of metadata packets by using the encryption method that follows the negotiation result of the interoperability negotiator 212.

The packet mixer 261 rearranges and outputs a plurality of encrypted contents packets, a plurality of right information packets, and a plurality of metadata packets (S115). In this instance, the packet mixer 261 can rearrange the packets according to the packet transmission order that follows the negotiation result of the interoperability negotiator 212.

The packet transmitter 262 transmits the rearranged packets output by the packet mixer 261 to the importer 300 (S117).

An importer 300 according to an exemplary embodiment of the present invention will now be described with reference to FIG. 5.

Figure 5:
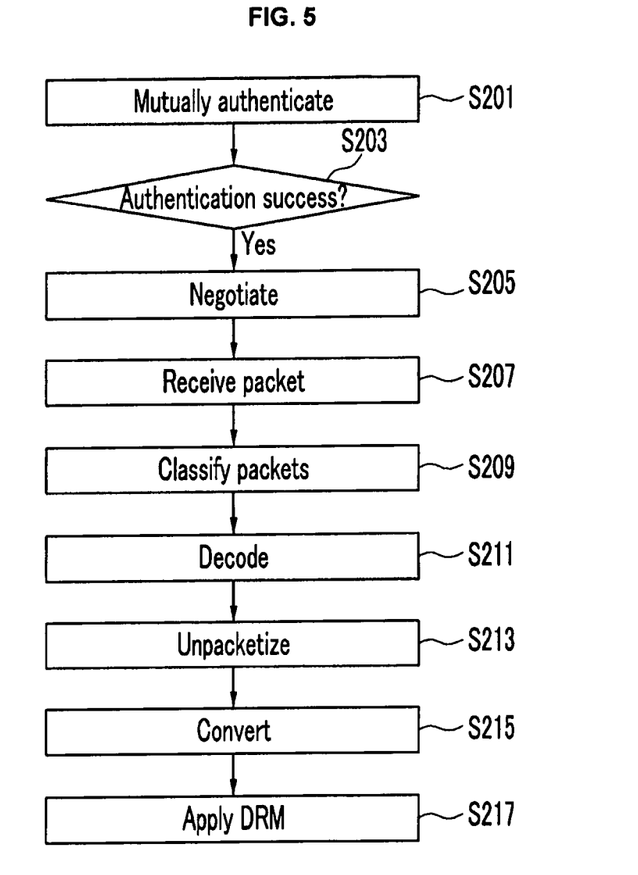
FIG. 5 is a flowchart of a contents importing method according to an exemplary embodiment of the present invention.

FIG. 5 is a flowchart for a contents importing method according to an exemplary embodiment of the present invention.

The authenticator 311 mutually authenticates with the authenticator 211 of the exporter 200 (S201).

When the authentication is normally finished (S203), the interoperability negotiator 312 negotiates with the interoperability negotiator 212 of the exporter 200 (S205). In this instance, the interoperability negotiator 312 can perform negotiation for the resolution, codec, and compression rate of the contents stream to be received from the exporter 200, the description language of the right information stream to be received from the exporter 200, and the description language of the metadata stream to be received from the exporter 200. Also, the interoperability negotiator 212 can negotiate regarding the size, encryption method, and transmission order of packets to be received from the exporter 200.

The packet receiver 321 receives a plurality of packets from the packet transmitter 262 of the exporter 200 (S207).

The packet classifier 322 classifies a plurality of packets received by the packet receiver 321 into a plurality of contents packets, a plurality of right information packets, and a plurality of metadata packets, and outputs them (S209). In this instance, the packet classifier 322 classifies the packets according to packet type information of the packet header.

The decoder 330 decodes a plurality of packets output by the packet classifier 322 to generate and output a plurality of decoded packets (S211). In this instance, the decoder 330 can decode a plurality of packets by using the encryption according to the negotiation result of the interoperability negotiator 312. When the packets are not encrypted while there is no problem of illegal stealth of contents during packet transmission, the decoder 330 may not perform decoding or omit decoding.

In detail, the contents decoder 331 decodes a plurality of contents packets output by the packet classifier 322 to generate and output a plurality of decoded contents packets. In this instance, the contents decoder 331 can decode a plurality of contents packets by using the encryption method caused by the negotiation result of the interoperability negotiator 312.

The right information decoder 332 decodes a plurality of right information packets output by the packet classifier 322 to generate and output a plurality of decoded right information packets. In this instance, the right information decoder 332 can decode a plurality of right information packets by using the encryption method caused by the negotiation result of the interoperability negotiator 312.

The metadata decoder 333 decodes a plurality of metadata packets output by the packet classifier 322 to generate and output a plurality of decoded metadata packets. In this instance, the metadata decoder 333 can decode a plurality of metadata packets by using the encryption method according to the negotiation result of the interoperability negotiator 312.

The unpacketizer 340 restores the contents stream, the right information stream, and the metadata stream by sequentially processing a plurality of decoded contents packets, a plurality of decoded right information packets, and a plurality of decoded metadata packets (S213).

In detail, the contents unpacketizer 341 restores the contents stream by using a plurality of decoded contents packets.

The right information unpacketizer 342 restores the right information stream by using a plurality of decoded right information packets.

The metadata unpacketizer 343 restores the metadata stream by using a plurality of decoded metadata packets.

The converter 350 converts the restored contents stream, the restored right information stream, and the restored metadata stream into a format to be detected by the second DRM device 400 (S215).

In detail, the contents converter 351 converts the contents stream by using the resolution, the codec, and the compression rate for the second DRM device 400 to generate and output a converted transformed contents stream.

The right information converter 352 converts the restored right information stream into the description language of the second DRM to generate and output a converted transformed right information stream.

The metadata converter 353 converts the restored metadata stream into the description language of the second DRM to generate and output a converted metadata stream.

The DRM applier 360 applies the second DRM to the converted contents stream, converted right information stream, and converted metadata stream to generate the second DRM applied contents, and provides them to the second DRM device 400 (S217).

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting data between a first contents management device and a second contents management device, the method comprising:
   initiating a negotiation between the first and the second contents management devices to determine a transmission format associated with the second contents management device;
   canceling a first digital rights management (DRM) applied to data received from the first contents management device, the data including a content packet, right information packet and a metadata packet;
   converting the data received from the first contents management device into data having the transmission format associated with the second contents management device;
   transmitting the data having the transmission format associated with the second contents management device to the second contents management device, the transmission format including a resolution, codec, and compression rate for the content packet, a description language of the right information packet, and a description language of the metadata packet; and
   applying a second digital rights management (DRM) to the data to provide the data to the second contents management device.

2. The method of claim 1, wherein the negotiation is performed between an exporter associated with the first contents management device and an importer associated with the second contents management device.

3. The method of claim 1, wherein the transmission format further includes a packet size, and
   wherein the data is transmitted as a packet having the packet size defined by the transmission format.

4. The method of claim 3, wherein the transmission format further includes an encryption method, and
   wherein the method further includes encrypting the data according to the encryption method.

5. A non-transitory computer readable medium configured to transmit data between a first contents management device and a second contents management device, the non-transitory computer readable medium comprising:
   a code for initiating a negotiation between the first and the second contents management devices to determine a transmission format associated with the second contents management device;
   a code for canceling a first digital rights management (DRM) applied to data received from the first contents management device, the data including a content packet, right information packet and a metadata packet;
   a code for converting the data received from the first contents management device into data having the transmission format associated with the second contents management device;
   a code for transmitting the data having the transmission format associated with the second contents management device to the second contents management device, the transmission format including a resolution, codec, and compression rate for the content packet, a description language of the right information packet, and a description language of the metadata packet; and
   a code for applying a second digital rights management (DRM) to the data to provide the data to the second contents management device.

6. The medium of claim 5, wherein the negotiation is performed between an exporter associated with the first contents management device and an importer associated with the second contents management device.

7. The medium of claim 5, wherein the transmission format further includes a packet size and an encryption method, and wherein the code for converting the data received from the first contents management device into data having the transmission format associated with the second contents management device includes:
   converting a contents stream into the contents packet according to the resolution, the codec, and the compression rate defined by the transmission format;
   packaging the contents packets with the packet size defined by the transmission format; and encrypting the contents packets by using the encryption method defined by the transmission format.

8. The medium of claim 5, wherein the transmission format further includes a packet size and an encryption method, and wherein the code for converting the data received from the first contents management device into data having the transmission format associated with the second contents management device includes:
- converting a right information stream into the right information packets according to the description language defined by the transmission format;
- packaging the right information packets with the packet size defined by the transmission format; and
- encrypting the right information packets using the encryption method defined by the transmission format.

9. The medium of claim 5, wherein the transmission format further includes a packet size and an encryption method, and wherein the code for converting the data received from the first contents management device into data having the transmission format associated with the second contents management device includes:
- a code for converting a metadata stream into the metadata packets according to the description language defined by the transmission format;
- a code for packaging the metadata packets with the packet size defined by the transmission format; and
- a code for encrypting the metadata packets according to the encryption method defined by the transmission format.

10. The medium of claim 5, wherein the transmission format further includes a packet transmission order, and wherein the code for transmitting the data having the transmission format associated with the second contents management device to the second contents management device includes:
- a code for rearranging the contents packets, the right information packets, and the metadata packets according to the packet transmission order defined by the transmission format; and
- a code for transmitting the rearranged packets to the importer.

11. A method for transmitting data between a first contents management device and a second contents management device, the method comprising:
- initiating a negotiation between the first and the second contents management devices to determine a transmission format;
- receiving first data in the transmission format from an exporter associated with the first contents management device, the exporter canceling a first digital rights management (DRM) previously applied to the first data;
- applying a second digital rights management (DRM) to the first data to convert the first data into second data according to the transmission format; and
- providing the second data to the second contents management device,
- wherein the second data includes a contents stream, a right information stream, and a metadata stream, and
- wherein the transmission format determined by the negotiation includes a resolution, a codec and a compression rate of the content packet, a description language of the right information stream, and a description language of the metadata stream.

12. The method of claim 11, wherein the second data has a format compatible with the second contents management device.

13. The method of claim 12, wherein the transmission format further includes a packet encryption method, and
- wherein the method further comprises decoding the first data according to a decoding method corresponding to the encryption method defined by the transmission format.

14. A non-transitory computer readable medium configured to transmit data between a first contents management device and a second contents management device, the non-transitory computer readable medium comprising:
- a code for initiating a negotiation between the first and the second contents management devices to determine a transmission format;
- a code for receiving first data in the transmission format from an exporter associated with the first contents management device, the exporter canceling a first digital rights management (DRM) previously applied to the first data;
- a code for applying a second digital rights management (DRM) to the first data to convert the first data into second data; and
- a code for providing the second data to the second contents management device,
- wherein the first data includes contents packets, right information packets, and metadata packets each in the transmission format, and
- wherein the second data includes a contents stream, a right information stream, and a metadata stream,
- wherein the transmission format determined by the negotiation includes a resolution, a codec and a compression rate of the contents packet, a description language of the right information packet, and a description language of the metadata packet.

15. The medium of claim 14, wherein the transmission format further includes a packet encryption method, and
- wherein the code for applying a second digital rights management (DRM) to the first data to convert the first data into second data includes:
- decoding the contents packets using the encryption method defined by the transmission format; and
- applying the second DRM to the decoded contents packets to convert the decoded contents packets into the contents stream.

16. The medium of claim 14, wherein the transmission format further includes a packet encryption method, and
- wherein the code for applying a second contents management (DRM) to the first data to convert the first data into second data includes:
- decoding the right information packets using the encryption method defined by the transmission format; and
- applying the second DRM to the decoded right information packets to convert the decoded right information packets into the right information stream.

17. The medium of claim 14, wherein the transmission format further includes a packet encryption method, and
- wherein the code for applying a second contents management (DRM) to the first data to convert the first data into second data includes:
- decoding the metadata packets using the encryption method defined by the transmission format; and
- applying the second t DRM to the decoded metadata packets to convert the decoded metadata packets into the metadata stream.

* * * * *